(No Model.)

W. SHERIDON.
WHEEL.

No. 442,832. Patented Dec. 16. 1890.

WITNESSES
Carroll J. Webster

INVENTOR
William Sheridon
By Myers & Webster
Att's

UNITED STATES PATENT OFFICE.

WILLIAM SHERIDON, OF TOLEDO, OHIO.

WHEEL.

SPECIFICATION forming part of Letters Patent No. 442,832, dated December 16, 1890.

Application filed May 2, 1890. Serial No. 350,282. (No model.)

*To all whom it may concern:*

Be it known that I, WILLIAM SHERIDON, a citizen of the United States, residing at Toledo, in the county of Lucas and State of Ohio, have invented certain new and useful Improvements in Methods of Securing Rubber Tires upon Wheel-Rims; and I do hereby declare that the following is a full, clear, and exact description of the invention, which will enable others skilled in the art to which it appertains to make and use the same, reference to be had to the accompanying drawings, and to the figures of reference marked thereon, which form part of this specification.

This invention relates to a method of securing rubber tires in place upon the tires of metal wheels.

Heretofore it has been customary to secure rubber tires in place upon the tire by means of a suitable adhesive substance. It has been found in practice that after a time the rubber tires, from continued use and the heat to which they are subjected in passing over heated pavements, become loosened upon the tire and not infrequently drop off from the same. It is the object of the invention to overcome these obstacles in a simple and effective manner by so securing the rubber tire in place that no matter how loose it may become it cannot detach itself from the tire, but will be held in place thereon, even though it breaks; and to these ends the invention consists, broadly, in providing a wheel having a curved tire, placing on said tire a rubber tire having return-flanges formed thereon, and then straightening out the said tire until it assumes a horizontal plane, whereby its edges are caused to impinge against the rubber tire, and thus hold it securely in place.

In the accompanying drawings, forming part of this specification, and in which like numerals of reference indicate corresponding parts, I have illustrated the method of carrying my invention into effect.

Figure 1:
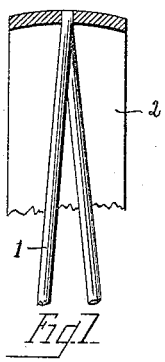
Figure 2:
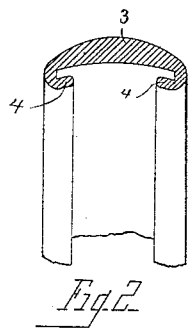
Figure 3:
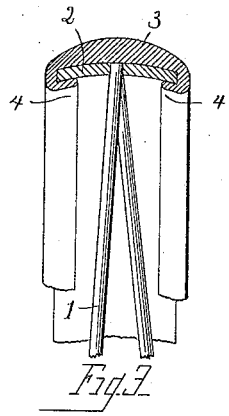

In the drawings, Figure 1 is an elevation of a section of a metallic wheel, showing the tire curved. Fig. 2 is a similar view of a section of the tire. Fig. 3 is a view showing the rubber tire in place upon the tire previous to said tire being straightened out, and Fig. 4 is a view showing the wheel as it appears when ready for use.

Referring to the drawings, 1 designates the metallic spokes of a wheel, and 2 the tire, which, as will be observed, is curved, preferably, toward the hub of the wheel. Upon this tire is fitted the rubber tire 3, which is constructed with return-flanges 4, between which the tire 2 fits.

Figure 4:
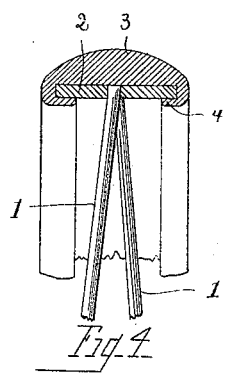

In carrying my invention into effect the rubber tire is placed upon the tire, as shown in Fig. 3, after which the wheel is placed within a suitable machine and the tire flattened out, as shown in Fig. 4, which flattening increases its transverse diameter and causes the edges of the tire to impinge with great force against the rubber tire, which latter is placed under tension sufficient to hold it securely in place upon the tire.

By this method the adhesive substance usually employed for this purpose is done away with and the tire held more securely in place than were it adopted, for it will be readily seen that if the rubber tire does become loose upon the tire it will be held in place thereon by means of the flanges before referred to.

Having thus fully described my invention, what I claim as new, and desire to secure by Letters Patent, is—

The herein-described method of securing rubber tires in place upon the tires of metallic wheels, which consists in providing a wheel having a curved tire, placing thereon a rubber tire having return-flanges, then straightening out the said tire until it assumes a horizontal plane, whereby its edges are caused to impinge against the rubber tire and hold it securely in place.

In testimony that I claim the foregoing as my own I hereto affix my signature in presence of two witnesses.

WILLIAM SHERIDON.

Witnesses:
  WILLIAM WEBSTER,
  ROBT. M. ELLIOTT.